United States Patent
Chayat (10) Patent No.: US 10,154,422 B2
(45) Date of Patent: Dec. 11, 2018

(54) SUBBAND-BASED MODULATION TESTER

(71) Applicant: VAYYAR IMAGING LTD., Yehud (IL)

(72) Inventor: Naftali Chayat, Kfar Saba (IL)

(73) Assignee: VAYYAR IMAGING LTD., Yehud (IL)

(*) Notice: Subject to any disclaimer, the term of this patent is extended or adjusted under 35 U.S.C. 154(b) by 114 days.

(21) Appl. No.: 15/290,453

(22) Filed: Oct. 11, 2016

(65) Prior Publication Data

US 2017/0105132 A1  Apr. 13, 2017

Related U.S. Application Data

(60) Provisional application No. 62/238,763, filed on Oct. 8, 2015.

(51) Int. Cl.
| | |
|---|---|
| H04W 24/06 | (2009.01) |
| H04L 27/36 | (2006.01) |
| H04L 5/00 | (2006.01) |
| H04B 17/29 | (2015.01) |
| H04B 17/309 | (2015.01) |
| H04B 17/30 | (2015.01) |
| H04L 27/26 | (2006.01) |

(52) U.S. Cl.
CPC ............ *H04W 24/06* (2013.01); *H04B 17/29* (2015.01); *H04B 17/30* (2015.01); *H04B 17/309* (2015.01); *H04L 5/0007* (2013.01); *H04L 5/0048* (2013.01); *H04L 27/2601* (2013.01)

(58) Field of Classification Search
CPC ...... H04W 24/06; H04B 17/30; H04L 5/0007; H04L 5/0048; H04L 27/2601
See application file for complete search history.

(56) References Cited

U.S. PATENT DOCUMENTS

| | | | | |
|---|---|---|---|---|
| 2003/0151799 | A1* | 8/2003 | Wight | H01S 3/2383 |
| | | | | 359/334 |
| 2012/0109548 | A1* | 5/2012 | Asami | H04L 27/364 |
| | | | | 702/58 |
| 2014/0119316 | A1* | 5/2014 | Linden | H04L 5/0044 |
| | | | | 370/329 |

FOREIGN PATENT DOCUMENTS

| | | |
|---|---|---|
| EP | 1750408 A2 | 2/2007 |
| EP | 1760961 A2 | 3/2007 |

* cited by examiner

*Primary Examiner* — Kiet Tang
(74) *Attorney, Agent, or Firm* — Browdy and Neimark, PLLC (57) ABSTRACT

Methods and systems are disclosed which allow testing essential performance parameters of broadband communications systems, while using test channels of lower bandwidth, allowing thus lower cost hardware (or use of legacy test system). In particular, the methods and systems allow testing of EVM in digital systems, especially OFDM systems. The methods and systems readily apply to test equipment for production lines, such as IC testers of final product testers.

20 Claims, 8 Drawing Sheets

SUBBAND-BASED MODULATION TESTER

CROSS-REFERENCE

The present application claims priority to U.S. Provisional Application Ser. No. 62/238,763, filed on Oct. 8, 2015, entitled "SUBBAND-BASED MODULATION TESTER" which is incorporated herein by reference in its entirety.

INCORPORATION BY REFERENCE

All publications, patents, and patent applications mentioned in this specification are herein incorporated by reference to the same extent as if each individual publication, patent, or patent application was specifically and individually indicated to be incorporated by reference.

FIELD OF THE INVENTION

The invention relates to systems and methods for testing performance parameters of broadband communications systems, and more specifically, but not exclusively, to systems and methods for testing performance parameters of broadband communications systems while using test channels of lower bandwidth.

BACKGROUND

Modern communication systems evolve towards higher speeds, involving wider and wider communications channels. As an example, GSM systems use 200 KHz channels; 3G systems—5 MHz channels; IEEE802.11b WLANs—20 MHz, 802.11n—80 MHz, UWB WLANs—500 MHz, while the WiGig standard for WLANs at 60 GHz uses 2.16 GHz channels. One of the challenges with the new communications standards is to provide test equipment for characterizing such communications systems. The test equipment needs to provide fidelity of an order of magnitude better than the equipment under test, resulting in use of costly components. This issue is particularly penalizing in test equipment for production lines, where cost is paramount. As the communication products are produced in quantities of tens of millions, and even more (as with the Internet-of-Things trend), the cost of test equipment becomes a critical issue. To take an example, the WiGig modems use internally Analog-to-Digital Converters at 2.64 Gsample/sec, however these converters use relatively low resolution of 6 bits. Test equipment for such equipment would preferably use 9-10 bit converters. However, 10 bit converters at 2.64 Gsample/sec are rare and extremely costly.

It is therefore preferable to have methods and systems for testing communication equipment using low-cost instruments which use lower-cost components. Yet another benefit would be the ability to use legacy test equipment which does not yet support the channel bandwidth of the new equipment under test. Current invention illustrates such methods, taking WiGig tester as an example.

The straightforward solution to testing communications equipment is to down convert a communication signal to a low frequency, filter it to a bandwidth of communications channel, digitize the signal at a rate meeting the Nyquist criterion relative to the channel bandwidth, capture snapshots of data representing communications packets of the system under test, and analyze the collected data. The analysis can be performed in real time (such as using FPGAs) or offline on buffered data (e.g. using general purpose processor)., so as to obtain the performance criteria of interest.

One particular performance criterion for digital communications systems is Error Vector Magnitude (EVM), representing the distortion of the digital modulation "constellation" from its nominal values. The constellations can have differing number of points starting at 2 (for BPSK constellation) and going to 4 points for QPSK, and even larger numbers such as 16, 64, 256 and even higher for QAM (quadrature amplitude keying) modulation. The larger the constellation, the more data is carried by each "symbol" and the higher is the spectral efficiency of the modulation. On the other hand, large modulations require high signal-to-noise ratio at the receiver, and smaller EVM (transmitter distortion) is allowed. As a result, high-efficiency transmitters need to be tested for their EVM, the maximum value of which is typically specified in the standards.

SUMMARY OF INVENTION

Prior to the summary of the invention being set forth, it may be helpful to set forth definitions of certain terms that will be used hereinafter.

The term 'snapshot' as used herein is defined as a recording of signals over a final stretch of time used for further processing and analysis.

The term 'subband' as used herein is defined as a band of frequencies contained within the range of frequencies used for testing the communication channel, but not all of it.

Embodiments of the present disclosure provide a radio frequency system (e.g. tester) for testing equipment under test (EUT). The radio frequency system is configured to measure various performance parameters in EUT subbands and appropriately aggregating the resulted performance parameters, while using test channels of lower bandwidth than the channel bandwidth of the EUT, thus allowing lower cost hardware (or use of legacy test system).

While the tester can take many forms, in many embodiments the tester comprises a radio receiver unit wherein the radio receiver unit's channel bandwidth is smaller than the channel bandwidth of the EUT; and a measurement unit.

According to one aspect of the invention there are provided a radio frequency system for testing equipment under test (EUT), the radio frequency system comprising: a radio receiver unit wherein the radio receiver unit's channel bandwidth is smaller than the channel bandwidth of the EUT; a measurement unit, said measurement unit is configured to: segment the EUT channel bandwidth into a plurality of subbands, wherein the bandwidth of each subband of said plurality of subbands is contained within the radio receiver unit's channel bandwidth for at least one radio receiver's center frequency setting; sequentially configure said radio receiver to said center frequency setting; calculate a plurality of performance parameters in each said subband; and aggregate the plurality of performance parameters over the subbands to obtain a plurality of composite broadband performance parameters.

In some instances, for any one of the systems described herein, the aggregation comprises at least one of: performance parameters; taking maximum of the performance parameters; taking minimum of the performance parameters; concatenating the performance parameters.

In some instances, for any one of the systems described herein, the performance parameters are selected from the group consisting of: power; spectral flatness; spurious signal level; and spectral mask test.

In some instances, for any one of the systems described herein, the performance parameters are selected from the group consisting of: Error Vector Magnitude (EVM); and average deviation from expected waveform.

In some instances, for any one of the systems described herein, the calculation of performance parameters further comprises at least one of: packet detection, timing synchronization, carrier frequency estimation, channel estimation, carrier frequency tracking and timing tracking.

In some instances, for any one of the systems described herein, the calculation of performance parameters comprises upsampling of test channel data to a higher sampling rate.

In some instances, for any one of the systems described herein, the higher sampling rate is the baud rate of the broadband communications system or a rational multiple of it.

In some instances, for any one of the systems described herein, the high-sample-rate data is further offset according to the EUT center frequency.

In some instances, for any one of the systems described herein, the plurality of broadband performance parameters are further compared to pass or fail criteria.

In some instances, for any one of the systems described herein, the EUT is a communication system.

In some instances, for any one of the systems described herein, the EUT modulation format is OFDM.

In some instances, for any one of the systems described herein, wherein each subband of said OFDM encompasses at least one OFDM pilot subcarrier.

In some instances, for any one of the systems described herein, the EUT modulation format is a single carrier format.

In some instances, for any one of the systems described herein, the expected waveform of the EUT is known.

One aspect of the present disclosure provides method for testing an equipment under test (EUT), the method comprising: segmenting the EUT channel bandwidth into a plurality of subbands by a radio system wherein the channel bandwidth of a radio receiver of said radio system is smaller than the channel bandwidth of the EUT and wherein the bandwidth of each subband is contained within the radio receiver unit's channel bandwidth for at least one radio receiver's center frequency setting; sequentially configuring said radio receiver to said center frequency setting; calculating a plurality of performance parameters in each said subband; and aggregating the plurality of performance parameters over the subband to obtain a plurality of composite broadband performance parameters.

In some instances, for any one of the methods described herein, the aggregation comprises at least one of: summing the performance parameters; averaging the performance parameters; taking maximum of the performance parameters; taking minimum of the performance parameters; concatenating the performance parameters.

In some instances, for any one of the methods described herein, the performance parameters are selected from the group consisting of: power; spectral flatness; spurious signal level; and spectral mask test.

In some instances, for any one of the methods described herein, the performance parameters are selected from the group consisting of: Error Vector Magnitude (EVM); and average deviation from expected waveform.

In some instances, for any one of the methods described herein, the calculation of performance parameters further comprises at least one of: packet detection, timing synchronization, carrier frequency estimation, channel estimation, carrier frequency tracking and timing tracking.

In some instances, for any one of the methods described herein, the calculation of performance parameters comprises upsampling of test channel data to a higher sampling rate.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks, according to embodiments of the invention, could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein, are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE DRAWINGS

The subject matter disclosed may best be understood by reference to the following detailed description when read with the accompanying drawings in which.

DETAILED DESCRIPTION

In the following description, various aspects of the invention will be described. For the purposes of explanation, specific details are set forth in order to provide a thorough understanding of the invention. It will be apparent to one skilled in the art that there are other embodiments of the invention that differ in details without affecting the essential nature thereof. Therefore the invention is not limited by that which is illustrated in the figure and described in the specification, but only as indicated in the accompanying claims, with the proper scope determined only by the broadest interpretation of said claims.

A better understanding of the features and advantages of the present disclosure will be obtained by reference to the following detailed description that sets forth illustrative embodiments, in which the principles of embodiments of the present disclosure are utilized, and the accompanying drawings.

The embodiments disclosed herein can be combined in one or more of many ways to provide improved methods, systems and apparatus for testing performance parameters of broadband communications systems. One or more components of the embodiments disclosed herein can be combined with each other in many ways. In many embodiments, systems and methods as described herein can be used for testing or measuring essential performance parameters of an Equipment Under Test (EUT) such as broadband communications systems, while using test channels of lower bandwidth, e.g. bandwidth smaller than the channel bandwidth of the EUT allowing thus lower cost hardware (or use of legacy test system).

The embodiments disclosed herein are also capable to test equipment for production lines, such as IC (Integrated Circuit) testers of final product testers.

Alternatively or in combination, embodiments disclosed herein may apply to other systems such as equipment used in the industries such as the communication industry or radar industry allowing for example testing of EVM in digital systems, especially OFDM systems.

Methods and systems are provided for obtaining parameters such as key performance parameters of a broadband communications system by recording and analyzing snapshots over bandwidth which is a fraction of the total communications system channel bandwidth.

According to some embodiments there are provided methods and systems for obtaining parameters of a broadband communications system comprising capturing a data over a subband and analyzing a performance criterion in that subband. The performance criteria include, but are not limited to, EVM, distortion, spectral mask compliance, spectral flatness and transmit power. The methods comprise stepping the center frequency over several discrete values, so that the subbands cover the whole channel bandwidth, and then averaging or integrating (or otherwise aggregating) the performance criteria over bandwidth to finally obtain the desired broadband performance criterion.

An example of such performance criterion is EVM in OFDM (orthogonal frequency division multiplexing) systems. The OFDM systems convey data by transmitting it over multitude of narrowband channels ("subcarriers"). Typically there are tens to hundreds of such subcarriers, and sometimes even more. The average EVM distortion is obtained by averaging the distortion over consecutive symbols in time and over the subcarriers in frequency. It is therefore possible to measure the distortion over a subset of subcarriers at a time, by observing partial bandwidth, and after collecting the distortion in all the subcarriers, averaging them over frequency (or performing "average of averages"). A subtlety in this process is that there's a need for channel estimate in each subcarrier. Luckily, each subband contains also the training information required to recover the channel response within that subband. Another need is to perform carrier tracking. This can be accomplished, according to one embodiment, with the "pilot subcarriers" present in the OFDM modulation format, assuming that the subbands are wide enough to encompass few pilot subcarriers. Alternately, "data aided tracking" can be used—this technique may be used at low distortion levels typical to the test scenarios.

Looking for example at WiGig standard specifically, in the OFDM mode the subcarriers are ~5 MHz apart. There are 336 data subcarriers and 16 pilot subcarriers. The pilots are spaced apart each ~22 subcarriers, or about 114 MHz apart. The 2 GHz channel bandwidth can be analyzed in 4 subbands of 500 MHz each, so that each such subband contains some 85 data subcarriers and 5 pilots (with some overlap). The 5 pilot subcarriers allow decent carrier tracking, and as mentioned it can be augmented with decision aided tracking.

According to other embodiments the distortion analysis can be applied to Single Carrier mode of WiGig as well as to the OFDM mode. Particularly, the Parseval mathematical relation states that average power over frequency is equal to average power over time. This means that the average distortion of time domain error waveform can be measured by measuring the average distortion over frequency, and this, in turn, can be measured over subbands and then averaged. In this case, the test can be, preferably, performed with known packets, so that the desired waveform in each subband can be estimated and subtracted so as to obtain the error waveform—this is a reasonable assumption for a test mode of a communication device.

Additional tests readily performed over subbands are spectral mask measurements and spectral flatness tests. Yet another test possible with the subband-based setup is average power measurement, by integrating spectral density over frequency, and measuring the spectral density subband by subband, or alternately, summing the power levels in the subbands.

In an exemplary embodiment of a test system, the radio signal under test is filtered into subbands of 500 MHz, downconverted into in-phase and quadrature (I and Q) waveforms, and then digitized by 640 Msample/sec ADCs of ~10 effective bits. Subsequently, the waveforms are interpolated (by appropriate resampling algorithm, e.g. Gardner's algorithm with Farrow filters) to obtain the samples at 2640 Msample/sec (for OFDM mode), or 1760 Msample/sec (for Single Carrier mode). The interpolated samples are then offset in frequency according to the difference between the subband center frequency and the channel center frequency. From here, packet processing commences, starting with transmission detection, carrier frequency offset estimation, channel estimation, and data waveform processing. Obviously, the channel estimate will be valid only within the subband under test, but this suffices for the analysis of distortions within that subband.

Figure 1:
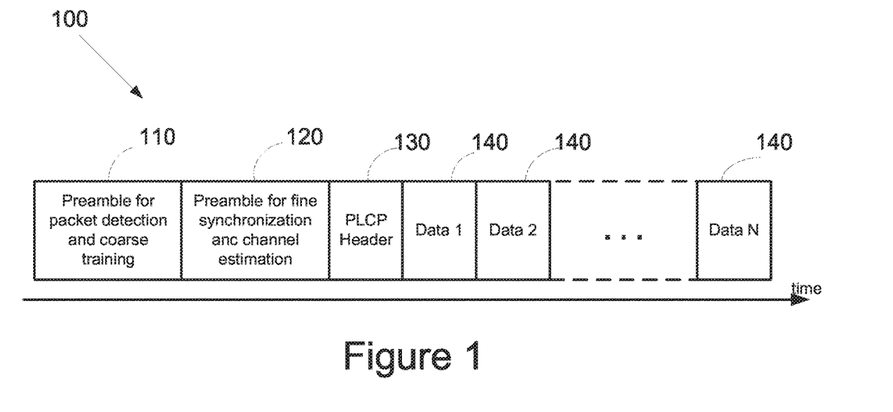
FIG. 1 illustrates a typical wireless data packet time domain structure, according to the prior art.

Reference is now made to FIG. 1 illustrating a typical wireless data packet time domain structure 100, in accordance with the prior art. The data packet 100 comprises a first preamble 110 for packet detection and coarse training followed by a second preamble 120 for example for fine synchronization and channel estimation. The data packet 100 further comprises a PLCP header 130 and data 1 to N in packets 140. The packet illustrated in FIG. 1 is typical to Wireless LAN structure, but similar principles apply to many other communication systems.

Figure 2:
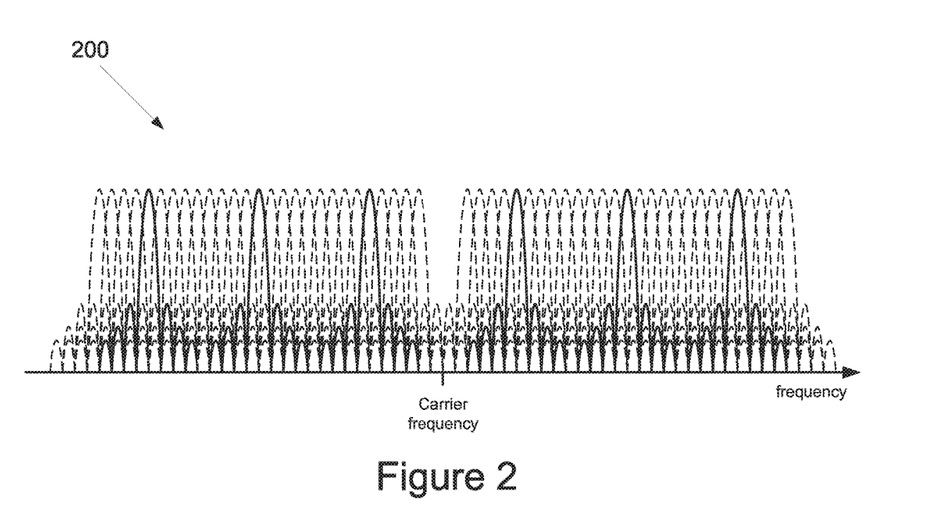
FIG. 2 illustrates a typical wireless OFDM data packet frequency domain structure, according to the prior art.

FIG. 2 illustrates a typical wireless OFDM data packet frequency domain structure 200, according to the prior art. The OFDM signal is composed of numerous orthogonal subcarriers, some of which are used as "pilot" subcarriers, used for synchronization, channel estimation and tracking. The pilot subcarriers are illustrated by solid lines, in contrast to data subcarriers, illustrated by dashed lines.

Figure 3:
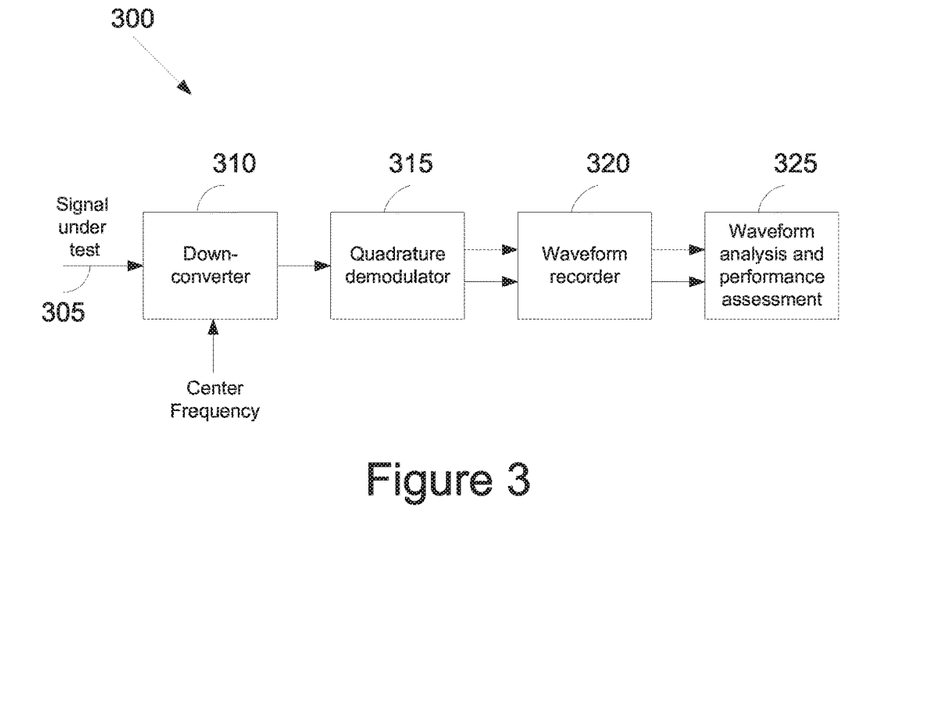
FIG. 3 illustrates a block diagram of test equipment for wireless communications system, in accordance with examples.

FIG. 3 illustrates a block diagram of test equipment system 300 for wireless communications systems in accordance with embodiments. The system 300 comprises a down converter unit 310 for converting a signal under test 305 received at the down converter unit, according to the desired center frequency. The system further comprises a quadrature demodulator 315 for decomposing the received signal into quadrature components, a waveform recorder 320 configured to record a segment of the downconverted waveforms and a waveform analysis and performance assessment unit 325 configured to analyze the received waveforms and to extract the performance indicators relevant to the received waveform. The performance indicators can include EVM, power, spectral shape and additional indicators.

Figure 4A:
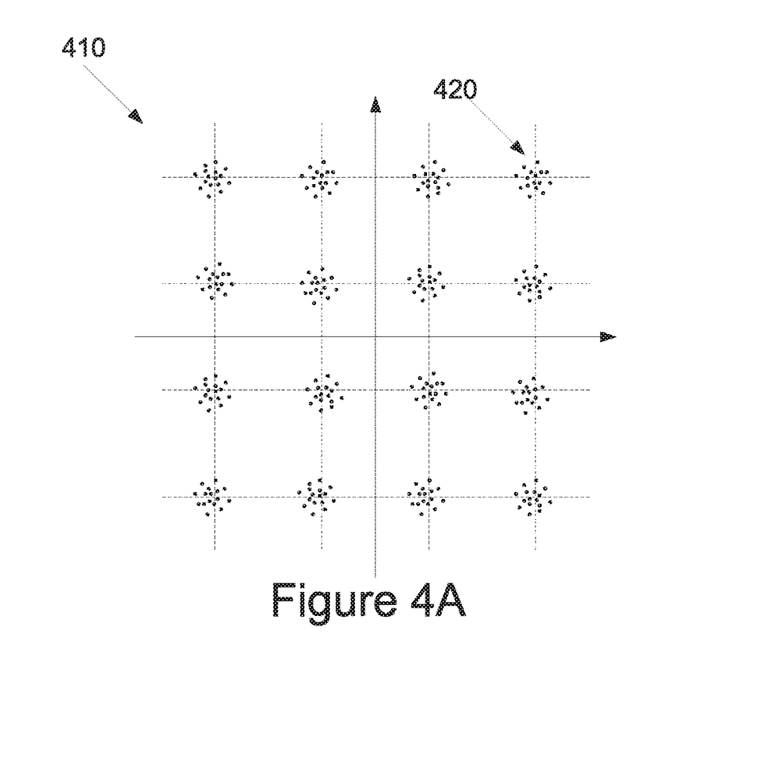
FIG. 4A illustrates a typical QAM constellation with "clouds" illustrating noise, in accordance with examples.

FIG. 4A shows a typical QAM constellation 410 (in this example 16-QAM) with "clouds" 420 illustrating noise. "Clouds" is a jargon notion for a collection of points in the vicinity of a desired location, distributed according to statistics of distortion and noise. The example of FIG. 4A illustrates an undistorted constellation, with the noise contribution being symmetrically distributed.

Figure 4B:
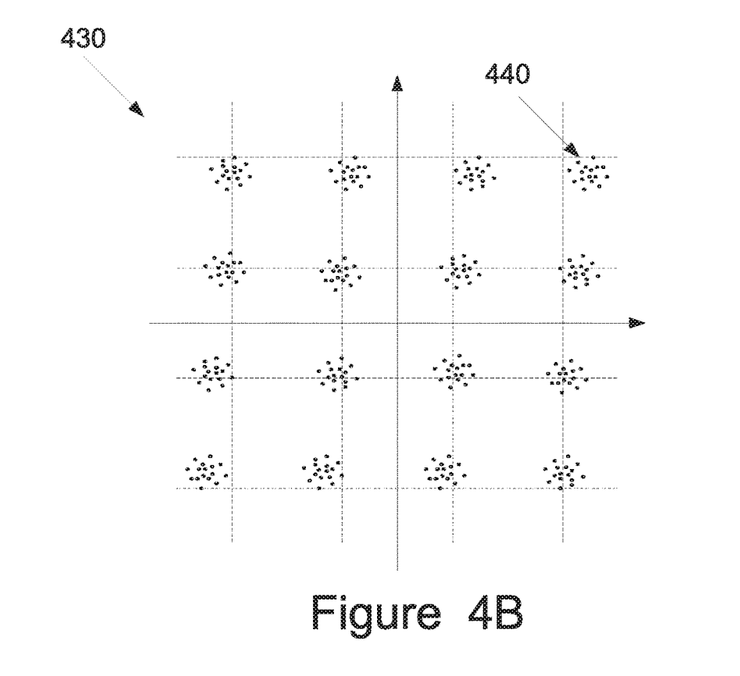
FIG. 4B illustrates QAM constellation with "clouds", illustrating noise, quadrature amplitude and phase imbalance, in accordance with examples.

FIG. 4b shows QAM constellation 430 with clouds 440 illustrating noise and a contribution of quadrature amplitude and phase imbalance. The contribution of quadrature imbalance is manifested by the centers of the clouds being on a rhombic rather than the desired rectangular grid.

Figure 4C:
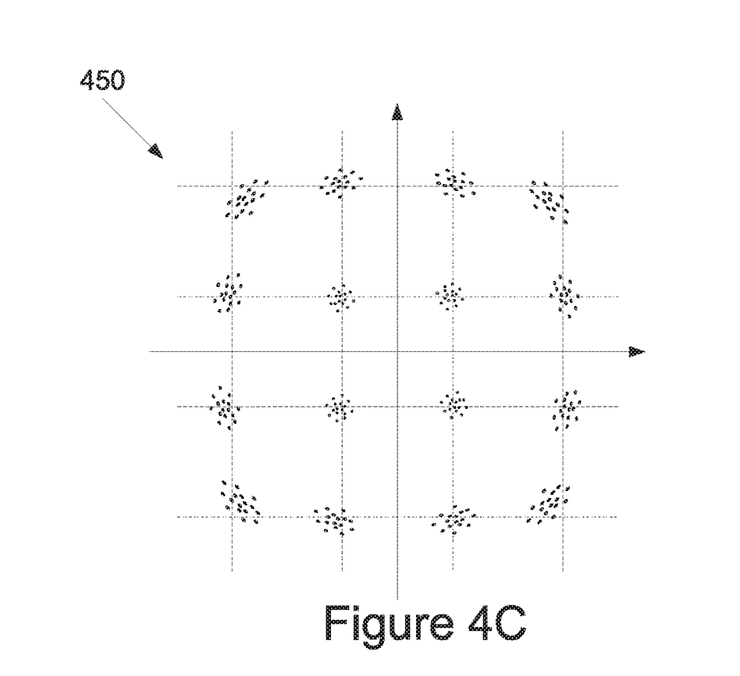
FIG. 4C illustrates QAM constellation illustrating noise, phase noise and gain compression, in accordance with examples.

FIG. 4C shows QAM constellation 450 illustrating noise, phase noise and gain compression. The gain compression in the transmitter manifests itself by having the outermost points being closer to the center than nominal, while the phase noise manifests itself as additional angular spreading, giving the "clouds" their asymmetric oval shape.

Figure 5:
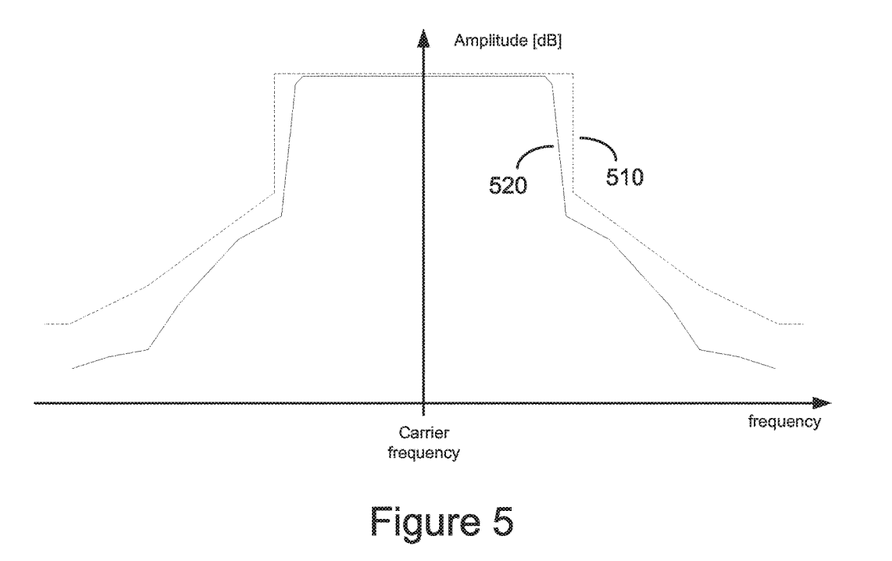
FIG. 5 illustrates a spectral shape of a signal in comparison with a spectral mask, in accordance with examples.

FIG. 5 illustrates a spectral shape 520 of a signal, in comparison with a spectral mask 510, in accordance with embodiments. Typically, signal has spectral sidebands beyond the desired channel of operation due to distortion, and the "mask" defines the maximum allowed level of the sidebands. ACPR (Adjacent Channel Power Ratio), obtained by integrating the power within an adjacent channel's bandwidth, is a measure of the level of interference to adjacent channels in view of such distortion, and the allowed ACPR level is usually regulated by applicable standards and is tested for.

Figure 6:
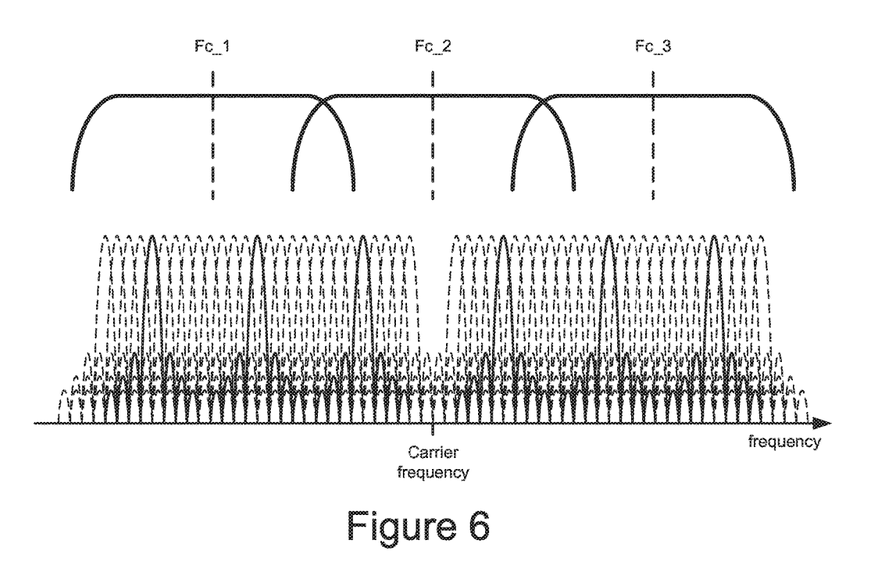
FIG. 6 illustrates an OFDM frequency domain with subdivision into subbands, in accordance with examples.

FIG. 6 illustrates an OFDM frequency domain 600 with subdivision into subbands, for the purpose of recording and analyzing the signal in each subband, in accordance with embodiments. In the example illustrated in FIG. 6 the bandwidth of the signal is segmented into 3 subbands, with center frequencies denoted by Fc_1, Fc_2 and Fc_3.

Figure 7:
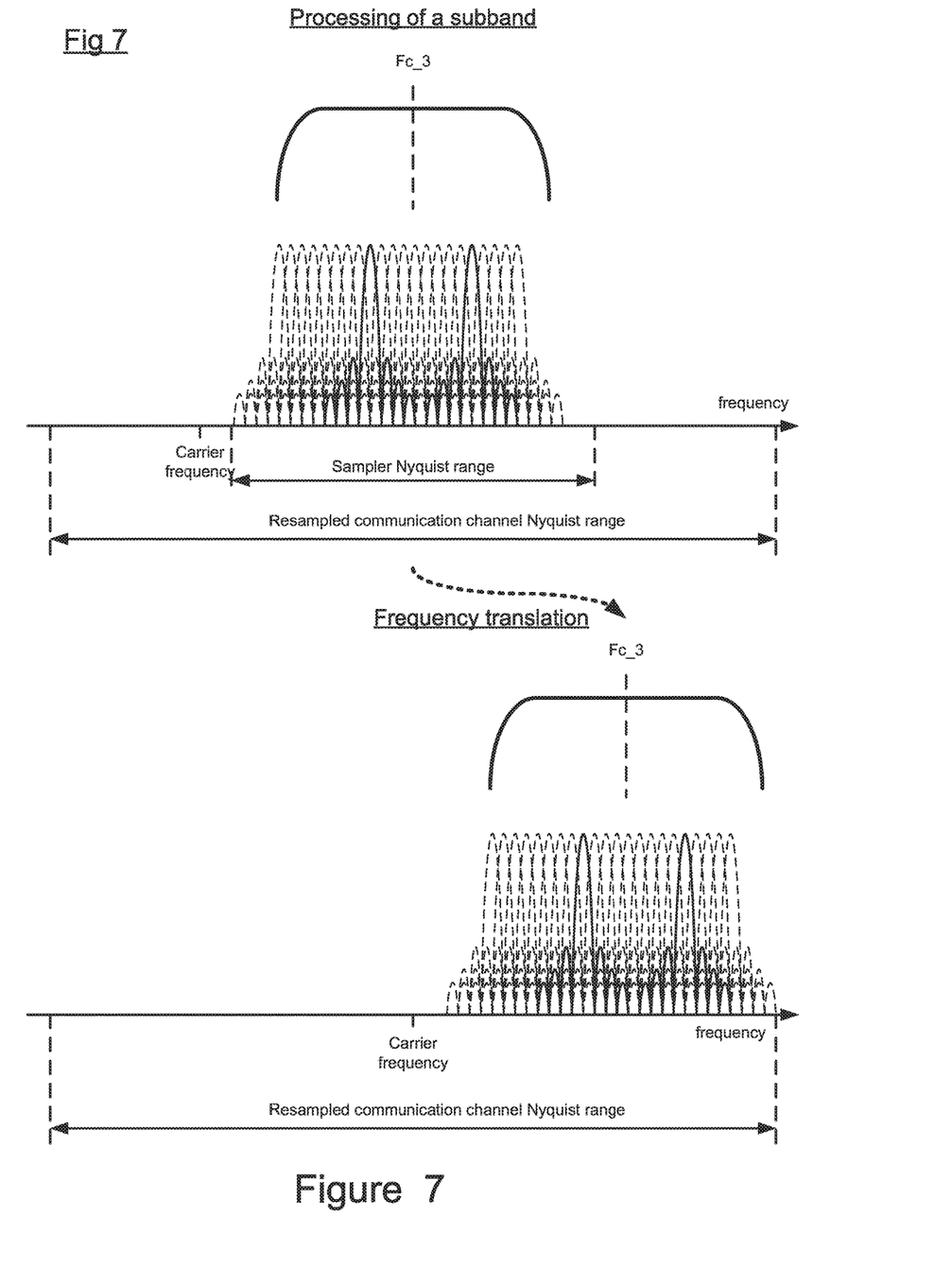
FIG. 7 illustrates a processing of a subband, in accordance with examples.

FIG. 7 illustrates a processing of a subband according to some embodiments. In the example, the signal sampled relative to center frequency which differs from the center frequency of the channel, in this case the center frequency Fc—3. In the course of processing, the recorded signal is up-sampled to a sampling rate adequate to represent the communications channel, and then translated in frequency to the desired location within the communications channel. It is assumed here at the signal processing operations of up-sampling and frequency translation are well-known in the art.

Figure 8:
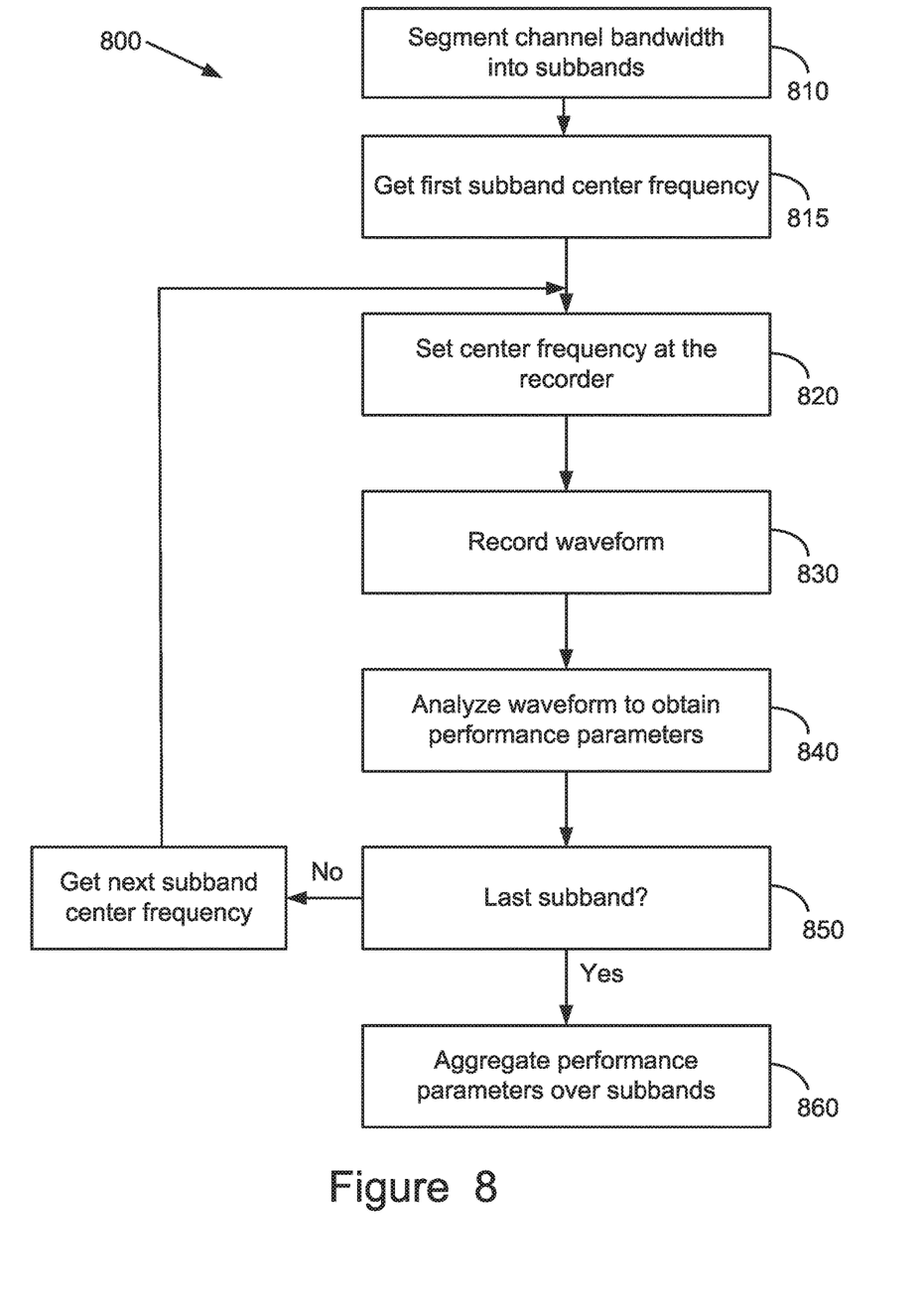
FIG. 8 shows a flow chart of a method for testing performance parameters of broadband communications while using test channels of lower bandwidth, in accordance with examples.

FIG. 8 shows a flow chart of a method 800 for testing performance parameters of broadband communications while using test channels of lower bandwidth, in accordance with embodiments. At step 810 signal's channel bandwidth is segmented, for example at a measurement unit 902 of a radio frequency system 900, into a plurality of subbands. In some embodiments the bandwidth of each segmented subband is contained within the radio receiver unit's channel bandwidth for at least one radio receiver's center frequency setting. At step 815 the first segmented subband center is received and at step 820 the center frequency is configured at the radio receiver recorder. At step 830 the waveform is recorded and at step 840 the waveform is analyzed to obtain a performance parameter of the subband. Steps 820-840 are repeated and a plurality of performance parameters in each subband are obtained till the last subband is received at step 850. At step 860 the plurality of performance parameters over the subbands are aggregated to obtain a plurality of composite broadband performance parameters.

Figure 9A:
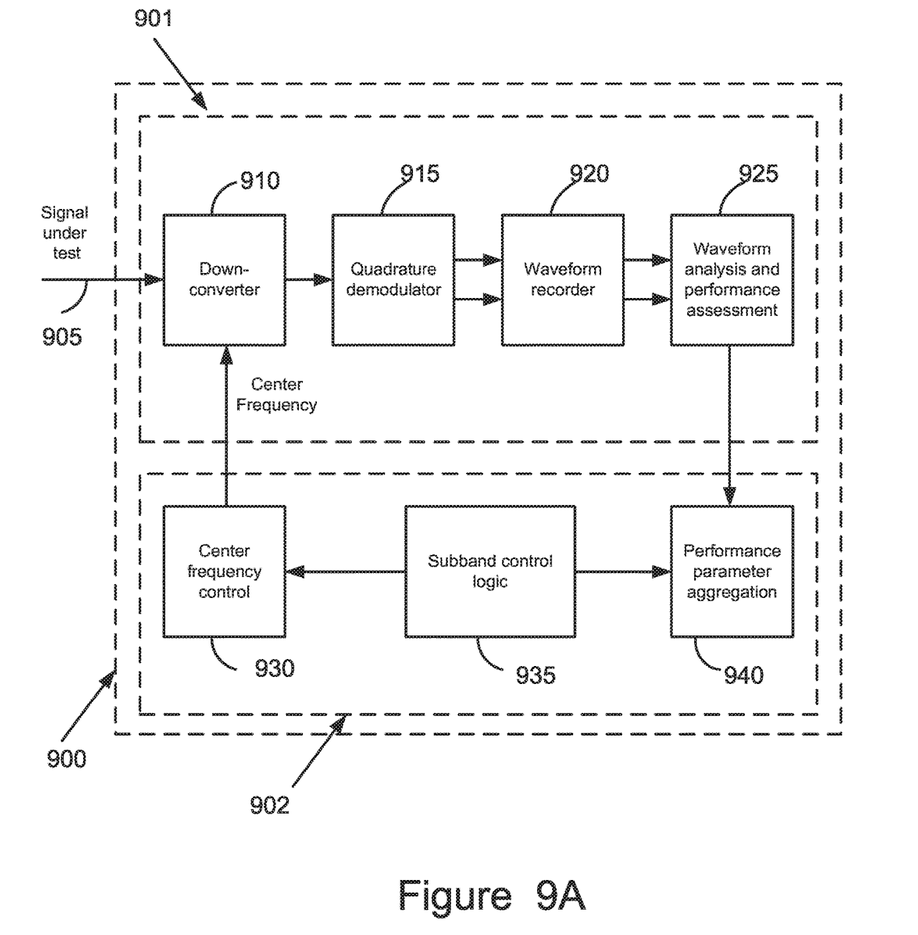
FIGS. 9A and 9B illustrate a test system in accordance with examples.

FIG. 9A illustrates a test system 900 in accordance with embodiments. The test system 900 is used to characterize one or more signals, for example a broadband signal 905 (e.g. signal under test) of EUT. In some cases, the system comprises a first part 901 (e.g. receiver unit) and a second part 902 (e.g. measurement unit). In some cases, the first part 901 resembles conventional test receivers, similar to one illustrated in FIG. 3. According to embodiments, the radio receiver unit's channel bandwidth is smaller than the channel bandwidth of the EUT. The first part 901 is used in conjunction with a measurement unit 902, which implements the logic of stepping through subbands, controlling the system 900 e.g. to operate each time at the desired center frequency, collecting the performance indicators for each subband from the receiver, and aggregating the per-subband performance parameters into overall performance parameters.

The first unit 901 may comprise a down converter unit 910 for converting a signal under test 905 received at the down converter unit, according to the desired center frequency. The system further comprises a quadrature demodulator 915 for decomposing the received signal into quadrature components, a waveform recorder 920 configured to record a segment of the downconverted waveforms and a waveform analysis and performance assessment unit 925 configured to analyze the received waveforms and to extract the performance indicators relevant to the received waveform. The performance indicators can include EVM, power, spectral shape and additional indicators.

The measurement unit 902 may comprise a subband control logic 935 which is in communication with a center frequency control module 930 and a performance parameter aggregation module 940, for implementing accordingly the logic of stepping through subbands, controlling the downconverter 910, e.g. to operate each time at the desired center frequency, collecting the performance indicators for each subband from the receiver, and aggregating the per-subband performance parameters into overall performance parameters.

Figure 9B:
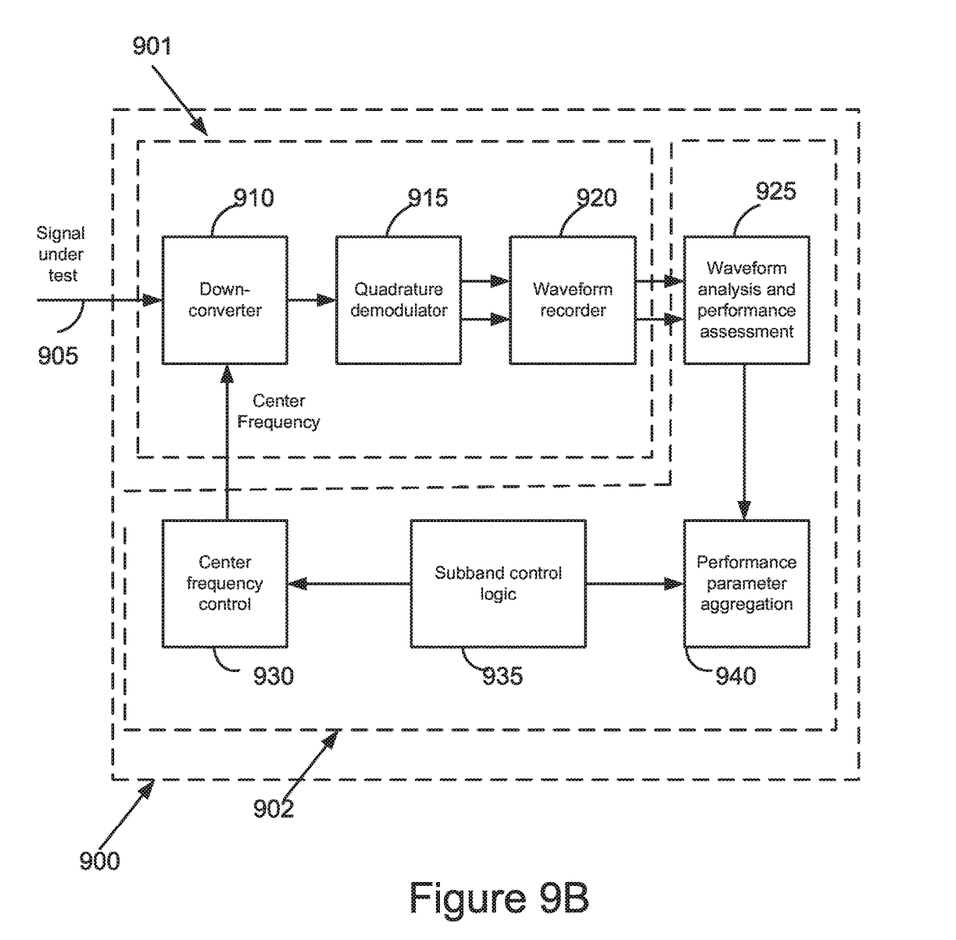

The notion of "receiver", in accordance with embodiments, can encompass the waveform analysis and performance assessment unit 925, as in FIG. 9A, or it can end at an earlier stage such as recording stage, leaving the waveform analysis and performance assessment unit to be external to the receiver. In particular embodiments, the waveform analysis and performance assessment function can be performed in conjunction with the performance aggregation function, as illustrated in FIG. 9B.

In some embodiments, the performance parameter aggregation module 940 can further compare the overall performance parameters to reference values generating pass or fail criteria.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only. The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

A person of ordinary skill in the art will recognize many variations, alterations and adaptations in response to the disclosure provided herein. For example, the order of the steps of the method can be changed, some of the steps removed, some of the steps duplicated or repeated, some of the steps substituted, and additional steps added as appropriate. Some of the steps may comprise sub-steps. The steps can be performed in any order. Some of the steps may be automated and some of the steps can be manual.

While preferred embodiments of the present disclosure have been shown and described herein, it will be obvious to those skilled in the art that such embodiments are provided by way of example only. Numerous variations, changes, and substitutions will be apparent to those skilled in the art without departing from the scope of the present disclosure. It should be understood that various alternatives to the embodiments of the present disclosure described herein may be employed without departing from the scope of the present invention. Therefore, the scope of the present invention shall be defined solely by the scope of the appended claims and the equivalents thereof.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A radio frequency system for testing equipment under test (EUT), the radio frequency system comprising:
   a radio receiver unit wherein the radio receiver unit's channel bandwidth is smaller than the channel bandwidth of the EUT;
   a measurement unit, said measurement unit is configured to:
      segment the EUT channel bandwidth into a plurality of subbands, wherein the bandwidth of each subband of said plurality of subbands is contained within the radio receiver unit's channel bandwidth for at least one radio receiver's center frequency setting;

sequentially configure said radio receiver unit to said at least one center frequency setting;
calculate a plurality of performance parameters in each said subband; and
aggregate the plurality of performance parameters over the subbands to obtain a plurality of composite broadband performance parameters.

2. The radio frequency system of claim 1, wherein said aggregation comprises at least one of:
 a) summing the performance parameters;
 b) averaging the performance parameters;
 c) taking a maximum of the performance parameters;
 d) taking a minimum of the performance parameters; and
 e) concatenating the performance parameters.

3. The radio frequency system of claim 1, wherein the performance parameters are selected from the group consisting of:
 a) power;
 b) spectral flatness;
 c) spurious signal level; and
 d) spectral mask test.

4. The radio frequency system of claim 1, wherein the performance parameters are selected from the group consisting of:
 a) Error Vector Magnitude (EVM); and
 b) average deviation from expected waveform.

5. The radio frequency system of claim 1, wherein the calculation of performance parameters further comprises at least one of:
 packet detection, timing synchronization, carrier frequency estimation, channel estimation, carrier frequency tracking and timing tracking.

6. The radio frequency system of claim 1, wherein the calculation of performance parameters comprises upsampling of test channel data to a higher sampling rate.

7. The radio frequency system of claim 6, wherein the higher sampling rate is the baud rate of the broadband communications system or a rational multiple of it.

8. The radio frequency system of claim 6, wherein the high-sample-rate data is further offset according to the EUT center frequency.

9. The radio frequency system of claim 1, wherein the plurality of broadband performance parameters are further compared to pass or fail criteria.

10. The radio frequency system of claim 1, wherein the EUT is a communication system.

11. The radio frequency system of claim 10, wherein the EUT modulation format is orthogonal frequency division multiplexing (OFDM).

12. The radio frequency system of claim 11, wherein each subband of said OFDM encompasses at least one OFDM pilot subcarrier.

13. The radio frequency system of claim 10, wherein the EUT modulation format is a single carrier format.

14. The radio frequency system of claim 13, wherein the expected waveform of the EUT is known.

15. A method for testing an equipment under test (EUT), the method comprising:
segmenting said EUT channel bandwidth into a plurality of subbands by a radio system wherein the channel bandwidth of a radio receiver unit of said radio system is smaller than the channel bandwidth of the EUT and wherein the bandwidth of each subband is contained within the radio receiver unit's channel bandwidth for at least one radio receiver's center frequency setting;
sequentially configuring said radio receiver unit to said at least one center frequency setting;
calculating a plurality of performance parameters in each said subband; and
aggregating the plurality of performance parameters over the subband to obtain a plurality of composite broadband performance parameters.

16. The method for testing an equipment under test (EUT) of claim 15, wherein said aggregation comprises at least one of:
 a) summing the performance parameters;
 b) averaging the performance parameters;
 c) taking a maximum of the performance parameters;
 d) taking a minimum of the performance parameters; and
 e) concatenating the performance parameters.

17. The method for testing an equipment under test (EUT) of claim 15, wherein the performance parameters are selected from the group consisting of:
 a) power;
 b) spectral flatness;
 c) spurious signal level; and
 d) spectral mask test.

18. The method for testing an equipment under test (EUT) of claim 15, wherein the performance parameters are selected from the group consisting of:
 a) Error Vector Magnitude (EVM); and
 b) average deviation from expected waveform.

19. The method for testing an equipment under test (EUT) of claim 15, wherein the calculation of performance parameters further comprises at least one of:
 packet detection, timing synchronization, carrier frequency estimation, channel estimation, carrier frequency tracking and timing tracking.

20. The method for testing an equipment under test (EUT) of claim 15, wherein the calculation of performance parameters comprises upsampling of test channel data to a higher sampling rate.

* * * * *